(12) United States Patent
Kawabuchi et al.

(10) Patent No.: US 10,316,956 B2
(45) Date of Patent: Jun. 11, 2019

(54) POWER TRANSFER DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Miki Kawabuchi, Nagoya (JP); Mitsumasa Matsubara, Nagoya (JP)

(73) Assignees: AISIN AW CO., LTD., Anjo-shi, Aichi (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 294 days.

(21) Appl. No.: 15/117,223

(22) PCT Filed: Mar. 13, 2015

(86) PCT No.: PCT/JP2015/057476
§ 371 (c)(1),
(2) Date: Aug. 8, 2016

(87) PCT Pub. No.: WO2015/146633
PCT Pub. Date: Oct. 1, 2015

(65) Prior Publication Data
US 2017/0159797 A1    Jun. 8, 2017

(30) Foreign Application Priority Data
Mar. 27, 2014 (JP) ................. 2014-066499

(51) Int. Cl.
*F16H 57/04* (2010.01)
*F16H 3/66* (2006.01)

(52) U.S. Cl.
CPC ......... *F16H 57/0453* (2013.01); *F16H 3/663* (2013.01); *F16H 57/0423* (2013.01);
(Continued)

(58) Field of Classification Search
CPC .. F16H 57/021; F16H 57/0453; F16H 57/042; F16H 57/0423; F16H 57/0424;
(Continued)

(56) References Cited

U.S. PATENT DOCUMENTS 3,529,698 A * 9/1970 Nelson .................... B61C 17/08
184/11.2
5,259,194 A * 11/1993 Okada .................... B60K 17/14
475/83
(Continued)

FOREIGN PATENT DOCUMENTS

DE    10 2011 003 221 A    8/2012
JP           1-85569 U       6/1989
(Continued)

OTHER PUBLICATIONS

International Search Report for PCT/JP2015/057476 dated Jun. 9, 2015.

*Primary Examiner* — William Kelleher
*Assistant Examiner* — Gregory Robert Weber
(74) *Attorney, Agent, or Firm* — Sughrue Mion, PLLC

(57) ABSTRACT

A flange portion of a reservoir plate is provided with a holding portion that holds a working oil supply pipe disposed on a converter housing and that is composed of an overhanging portion formed so as to overhang toward the converter housing and a dented portion formed in the overhanging portion along the working oil supply pipe. Consequently, it is possible to reduce the number of components and achieve better assembly compared to a configuration in which another member such as a clamp member is used to hold the working oil supply pipe. Since the holding portion is formed in a complex shape from the overhanging portion and the dented portion with recesses and projections, moreover, the strength of the holding portion against bending etc. can be enhanced.

16 Claims, 7 Drawing Sheets

(52) U.S. Cl.
CPC ..... *F16H 57/0424* (2013.01); *F16H 57/0445* (2013.01); *F16H 57/0452* (2013.01); *F16H 57/0457* (2013.01); *F16H 57/0483* (2013.01); *F16H 3/666* (2013.01); *F16H 2200/006* (2013.01); *F16H 2200/2007* (2013.01); *F16H 2200/2023* (2013.01); *F16H 2200/2046* (2013.01); *F16H 2200/2066* (2013.01); *F16H 2200/2082* (2013.01); *F16H 2200/2097* (2013.01)

(58) Field of Classification Search
CPC .. F16H 57/0483; F16H 3/663; F16H 57/0445; F16H 57/0452
USPC .......... 74/467, 343; 184/65, 13.1, 11.1, 11.2
See application file for complete search history.

(56) References Cited

U.S. PATENT DOCUMENTS

| | | | | |
|---|---|---|---|---|
| 5,505,112 | A * | 4/1996 | Gee | F16H 57/0447 180/339 |
| 7,353,733 | B2 * | 4/2008 | Suzuki | F16H 57/0483 184/6.12 |
| 7,984,791 | B2 * | 7/2011 | Taguchi | F16H 57/0483 184/11.1 |
| 8,167,758 | B2 * | 5/2012 | Downs | F16H 57/0483 184/11.1 |
| 8,267,827 | B2 * | 9/2012 | Durbin | F16H 57/0423 475/159 |
| 8,371,978 | B2 * | 2/2013 | Nobata | F16H 57/0457 475/160 |
| 9,328,817 | B2 * | 5/2016 | Yamashita | F16H 57/042 |
| 2012/0073403 | A1 * | 3/2012 | Perakes | F16H 57/0409 74/607 |
| 2013/0145879 | A1 * | 6/2013 | Nakamura | F16H 57/042 74/467 |

FOREIGN PATENT DOCUMENTS

| | | | | |
|---|---|---|---|---|
| JP | H01169171 | * | 7/1989 | ......... F16H 57/0421 |
| JP | 5-3721 U | | 1/1993 | |
| JP | H11108163 | * | 4/1999 | ........... F16H 57/027 |
| JP | 2006-275164 A | | 10/2006 | |
| JP | 2006275164 | * | 10/2006 | ......... F16H 57/0483 |
| JP | 2011-256918 A | | 12/2011 | |
| WO | 2011/121861 A1 | | 10/2011 | |

* cited by examiner

FIG. 2

|   | | C-1 | C-2 | C-3 | C-4 | B-1 | B-2 | F-1 |
|---|---|---|---|---|---|---|---|---|
| D | 1st | ○ | | | | | ● | ○ |
| | 2nd | ○ | | | | ○ | | |
| | 3rd | ○ | | ○ | | | | |
| | 4th | ○ | | | ○ | | | |
| | 5th | ○ | ○ | | | | | |
| | 6th | | ○ | | ○ | | | |
| | 7th | | ○ | ○ | | | | |
| | 8th | | ○ | | | ○ | | |
| REV1 | | | | ○ | | | ○ | |
| REV2 | | | | | ○ | | ○ | |

※○: ENGAGED,
●: ENGAGED WITH ENGINE BRAKE IN OPERATION

US 10,316,956 B2

POWER TRANSFER DEVICE

CROSS REFERENCE TO RELATED APPLICATIONS

This application is a National Stage of International Application No. PCT/JP2015/057476 filed Mar. 13, 2015, claiming priority based on Japanese Patent Application No. 2014-066499 filed Mar. 27, 2014, the contents of all of which are incorporated herein by reference in their entirety.

TECHNICAL FIELD

The present disclosure relates to a power transfer device, and in particular to a power transfer device that includes a differential ring gear disposed below a drive pinion gear on the input side and meshed with the drive pinion gear, a differential gear coupled to the differential ring gear, and a case that houses the differential ring gear and the differential gear.

BACKGROUND ART

There has hitherto been known a power transfer device that includes a counter shaft disposed in parallel with an input shaft of a speed change mechanism, a differential device (differential gear) that has a ring gear (differential ring gear) disposed below the counter shaft and meshed with an output gear of the counter shaft, a case member that houses the speed change mechanism and the differential device, and a differential partitioning member that partitions a space in the case member into a differential chamber, in which the differential device is housed, and a storage chamber, in which oil (working oil) is stored (see Patent Document 1, for example). In the power transfer device, the differential partitioning member is composed of a part of the case member, a rib member provided to extend along the outer peripheral surface of the ring gear from the case member, and a hemispherical reservoir plate disposed so as to cover the differential device from the side opposite to the case member and tightly contact the inner peripheral surface of the rib member. Consequently, in the power transfer device, an inflow of oil from the storage chamber into the differential chamber is suppressed by the differential partitioning member.

RELATED-ART DOCUMENTS

Patent Documents

[Patent Document 1] International Publication WO 2011/121861

SUMMARY

In the power transfer device according to the related art, a working oil supply pipe through which working oil is supplied from an oil passage formed in the case member to the differential chamber side may be disposed in the vicinity of the position of attachment of the reservoir plate. The working oil supply pipe is attached to an oil hole that communicates with the oil passage, and attached to the case member using a member such as a clamp configured to hold the working oil supply pipe.

It is a main object of the power transfer device according to the present disclosure to allow better assembly of a working oil supply pipe and a reservoir plate.

In order to achieve the foregoing main object, the power transfer device according to the present disclosure adopts the following means.

The present disclosure provides a power transfer device including: a differential ring gear disposed below a drive pinion gear on the input side and meshed with the drive pinion gear; a differential gear coupled to the differential ring gear; a case that houses the differential ring gear and the differential gear; and a partitioning member that partitions a space in the case into a differential chamber, in which the differential ring gear and the differential gear are disposed, and a working oil storage chamber, in which working oil is stored, wherein: the partitioning member forms the working oil storage chamber together with a first case member of the case, and forms the differential chamber together with a second case member of the case; a working oil supply pipe through which working oil is supplied to the differential gear is inserted into the first case member; and the partitioning member has a holding portion provided on the first case member side to push the working oil supply pipe in a direction of insertion.

In the power transfer device according to the present disclosure, the case has the first case member and the second case member, and the partitioning member forms the working oil storage chamber together with the first case member of the case, and forms the differential chamber together with the second case member of the case. The working oil supply pipe through which working oil is supplied to the differential gear is inserted into the first case member. The partitioning member has the holding portion which is provided on the first case member side to push the working oil supply pipe in the direction of insertion. That is, the working oil supply pipe is pushed by the holding portion of the partitioning member on the first case member side in the direction of insertion to be held. Therefore, it is possible to reduce the number of components and achieve better assemblability compared to a configuration in which another member such as a clamp member is used to hold the working oil supply pipe.

BRIEF DESCRIPTION OF THE DRAWINGS

FIG. 2 is an operation table illustrating the relationship between each shift speed of an automatic transmission 25 included in the power transfer device 20 of FIG. 1 and the respective operating states of clutches and brakes.

DETAILED DESCRIPTION OF A PREFERRED EMBODIMENT

Now, an embodiment of the present disclosure will be described with reference to the drawings.

Figure 1:
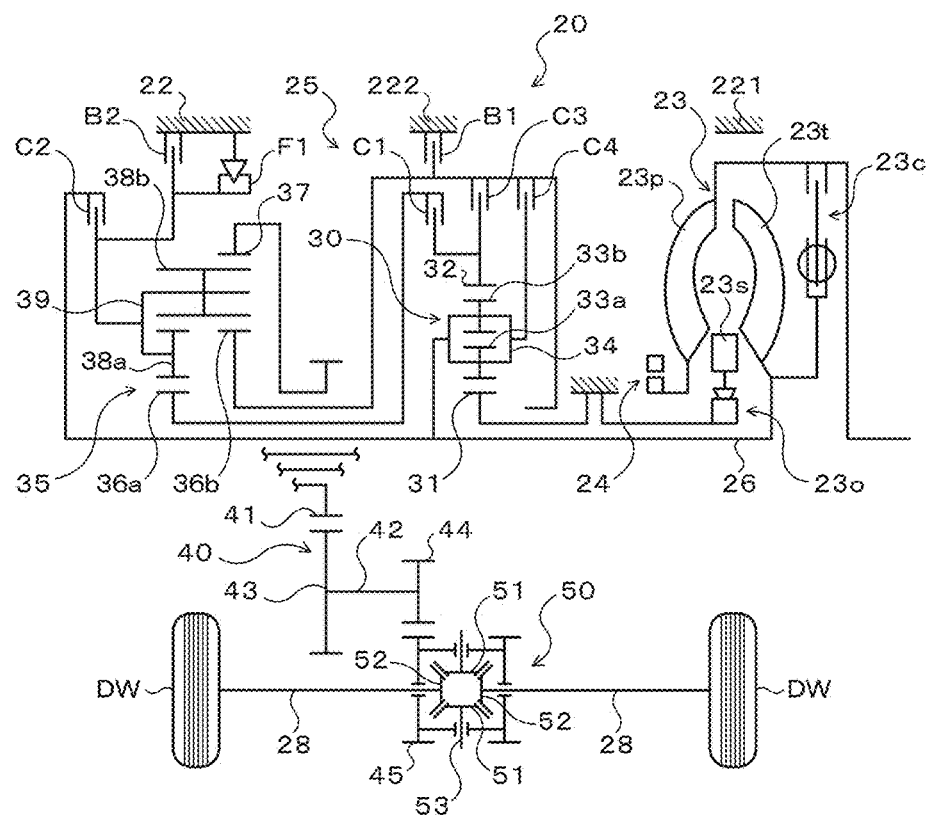
FIG. 1 is a schematic configuration diagram of a power transfer device 20 according to the present disclosure.

FIG. 1 is a schematic configuration diagram of a power transfer device 20 according to the present disclosure. The power transfer device 20 illustrated in the drawing is connected to a crankshaft of an engine (not illustrated) mounted on a front-drive vehicle, and can transfer power from the engine to left and right drive wheels (front wheels) DW. As illustrated in the drawing, the power transfer device 20 includes a transmission case 22 that includes a converter housing 220 (first case member) and a transaxle case 240 (second case member) coupled to the converter housing 220, a fluid transmission apparatus (starting device) 23 housed in the converter housing 220, an oil pump 24, an automatic transmission 25 housed in the transaxle case 240, a gear mechanism (gear train) 40, a differential gear (differential mechanism) 50, and so forth.

The fluid transmission apparatus 23 is structured as a torque converter that includes a pump impeller 23p on the input side connected to the crankshaft of the engine, a turbine runner 23t on the output side connected to an input shaft 26 of the automatic transmission 25, a stator 23s disposed on the inner side of the pump impeller 23p and the turbine runner 23t to rectify the flow of working oil from the turbine runner 23t to the pump impeller 23p, a one-way clutch 23o that restricts the rotational direction of the stator 23s to one direction, a lock-up clutch 23c, and so forth. It should be noted, however, that the fluid transmission apparatus 23 may be structured as a fluid coupling that does not include the stator 23s.

The oil pump 24 is structured as a gear pump that includes a pump assembly composed of a pump body and a pump cover, and an externally toothed gear connected to the pump impeller 23p of the fluid transmission apparatus 23 via a hub. The oil pump 24 is driven by power from the engine to suction working oil (ATF) stored in an oil pan (not illustrated) and pump the working oil to a hydraulic control device (not illustrated).

The automatic transmission 25 is structured as an 8-speed transmission. As illustrated in FIG. 1, the automatic transmission 25 includes a double-pinion type first planetary gear mechanism 30, a Ravigneaux type second planetary gear mechanism 35, and four clutches C1, C2, C3, and C4, two brakes B1 and B2, and a one-way clutch F1 that change a power transfer path from the input side to the output side.

The first planetary gear mechanism 30 includes a sun gear 31 which is an externally toothed gear, a ring gear 32 which is an internally toothed gear disposed concentrically with the sun gear 31, and a planetary carrier 34 that rotatably and revolvably holds a plurality of sets of two pinion gears 33a and 33b meshed with each other, one of the pinion gears 33a and 33b being meshed with the sun gear 31 and the other being meshed with the ring gear 32. As illustrated in the drawing, the sun gear 31 of the first planetary gear mechanism 30 is held stationary to the transmission case 22, and the planetary carrier 34 of the first planetary gear mechanism 30 is connected so as to be rotatable together with the input shaft 26. In addition, the first planetary gear mechanism 30 is structured as a so-called speed reduction gear, and reduces the speed of power transferred to the planetary carrier 34 which serves as an input element to output the power from the ring gear 32 which serves as an output element.

The second planetary gear mechanism 35 includes a first sun gear 36a and a second sun gear 36b which are each an externally toothed gear, a ring gear 37 which is an internally toothed gear disposed concentrically with the first and second sun gears 36a and 36b, a plurality of short pinion gears 38a meshed with the first sun gear 36a, a plurality of long pinion gears 38b meshed with the second sun gear 36b and the plurality of short pinion gears 38a and meshed with the ring gear 37, and a planetary carrier 39 that rotatably and revolvably holds the plurality of short pinion gears 38a and the plurality of long pinion gears 38b. The ring gear 37 of the second planetary gear mechanism 35 functions as an output member of the automatic transmission 25. Power transferred from the input shaft 26 to the ring gear 37 is transferred to the left and right drive wheels via the gear mechanism 40, the differential gear 50, and a drive shaft 28. In addition, the planetary carrier 39 is supported by the transmission case 22 via the one-way clutch F1. The rotational direction of the planetary carrier 39 is restricted to one direction by the one-way clutch F1.

The clutch C1 is a multi-plate friction-type hydraulic clutch (friction engagement element) that has a hydraulic servo structured from a piston, a plurality of friction plates and mating plates, an oil chamber supplied with working oil, and so forth, and that is capable of fastening and unfastening the ring gear 32 of the first planetary gear mechanism 30 and the first sun gear 36a of the second planetary gear mechanism 35 to and from each other. The clutch C2 is a multi-plate friction-type hydraulic clutch that has a hydraulic servo structured from a piston, a plurality of friction plates and mating plates, an oil chamber supplied with hydraulic oil, and so forth, and that is capable of fastening and unfastening the input shaft 26 and the planetary carrier 39 of the second planetary gear mechanism 35 to and from each other. The clutch C3 is a multi-plate friction-type hydraulic clutch that has a hydraulic servo structured from a piston, a plurality of friction plates and mating plates, an oil chamber supplied with working oil, and so forth, and that is capable of fastening and unfastening the ring gear 32 of the first planetary gear mechanism 30 and the second sun gear 36b of the second planetary gear mechanism 35 to and from each other. The clutch C4 is a multi-plate friction-type hydraulic clutch that has a hydraulic servo structured from a piston, a plurality of friction plates and mating plates, an oil chamber supplied with working oil, and so forth, and that is capable of fastening and unfastening the planetary carrier 34 of the first planetary gear mechanism 30 and the second sun gear 36b of the second planetary gear mechanism 35 to and from each other.

The brake B1 is a hydraulic brake (friction engagement element) that is structured as a band brake or a multi-plate friction-type brake including a hydraulic servo, and that is capable of making the second sun gear 36b of the second planetary gear mechanism 35 stationary and movable with respect to the transmission case 22. The brake B2 is a hydraulic brake that is structured as a band brake or a multi-plate friction-type brake including a hydraulic servo, and that is capable of making the planetary carrier 39 of the second planetary gear mechanism 35 stationary and movable with respect to the transmission case 22. In addition, the one-way clutch F1 includes an inner race, an outer race, a plurality of sprags, and so forth, for example. The one-way clutch F1 transfers torque via the sprags when the outer race rotates in one direction with respect to the inner race, and allows the inner race and the outer race to rotate with respect to each other when the outer race rotates in the other direction with respect to the inner race. It should be noted, however, that the one-way clutch F1 may be of a roller type or the like, other than the sprag type.

The clutches C1 to C4 and the brakes B1 and B2 operate with working oil supplied thereto and discharged therefrom by the hydraulic control device (not illustrated). FIG. 2 is an operation table illustrating the relationship between each shift speed of the automatic transmission 25 and the respective operating states of the clutches C1 to C4, the brakes B1 and B2, and the one-way clutch F1. The automatic transmission 25 provides first to eighth forward speeds and first and second reverse speeds when the clutches C1 to C4 and the brakes B1 and B2 are brought into the respective states illustrated in the operation table of FIG. 2. At least one of the clutches C1 to C4 and the brakes B1 and B2 may be a meshing engagement element such as a dog clutch.

The gear mechanism 40 includes: a counter drive gear 41 coupled to the ring gear 37 of the second planetary gear mechanism 35 of the automatic transmission 25; a counter driven gear 43 fixed to a counter shaft 42 that extends in parallel with the input shaft 26 of the automatic transmission 25 and meshed with the counter drive gear 41; a drive pinion gear (final drive gear) 44 formed on (or fixed to) the counter shaft 42; and a differential ring gear (final driven gear) 45 disposed below the drive pinion gear 44 (see FIG. 3) and meshed with the drive pinion gear 44. The differential ring gear 45 is constituted as a helical gear.

As illustrated in FIGS. 1 and 3 to 8, the differential gear 50 includes a pair of (two) pinion gears 51, a pair of (two) side gears 52 each fixed to the drive shaft 28 and meshed with the pair of pinion gears 51 at a right angle, a pinion shaft 53 that supports the pair of pinion gears 51, and a differential case 54 which houses the pair of pinion gears 51 and the pair of side gears 52 and to which the differential ring gear 45 discussed above is coupled (fixed). In the embodiment, the pinion gears 51 and the side gears 52 are each structured as a straight bevel gear. In addition, a pinion washer 55 is disposed between each of the pinion gears 51 and the differential case 54, and a side washer 56 is disposed between each of the side gears 52 and the differential case 54. The differential case 54 is rotatably supported by the transmission case 22 via bearings 81 and 82 coaxially with the drive shaft 28.

Figure 3:
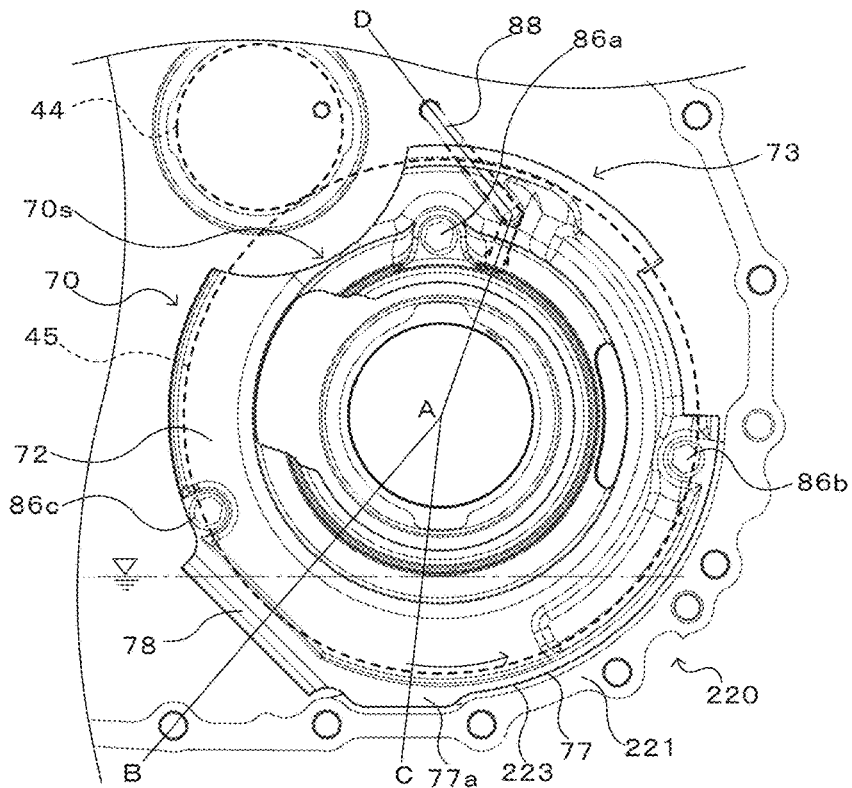
FIG. 3 is an explanatory diagram illustrating a state in which a reservoir plate 70 is attached to a converter housing 220.
Figure 4:
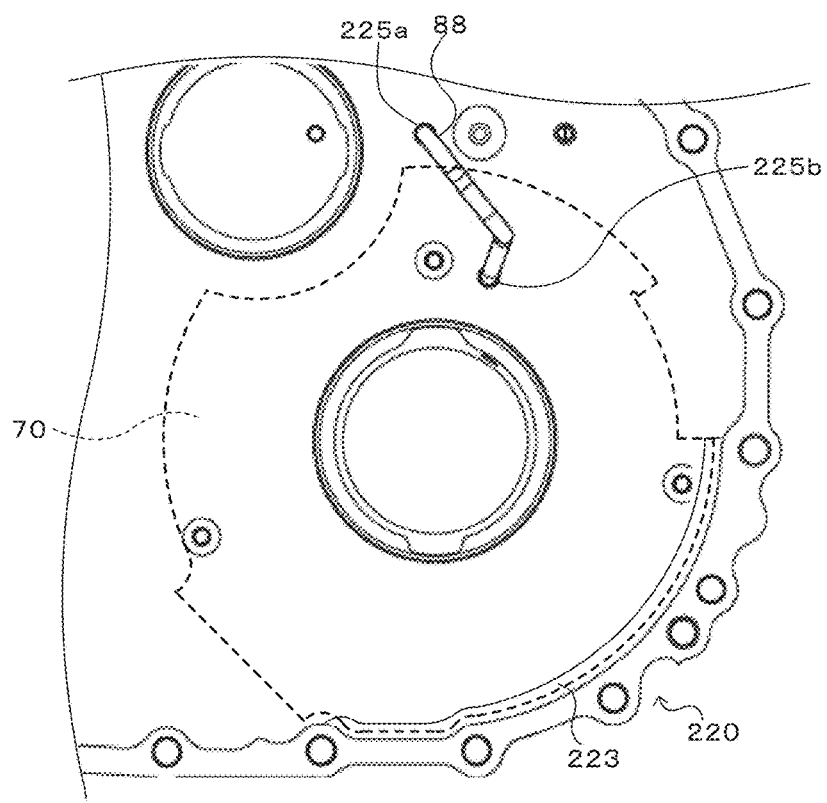
FIG. 4 is an explanatory diagram illustrating the converter housing 220 to which the reservoir plate 70 is not attached.
Figure 5:
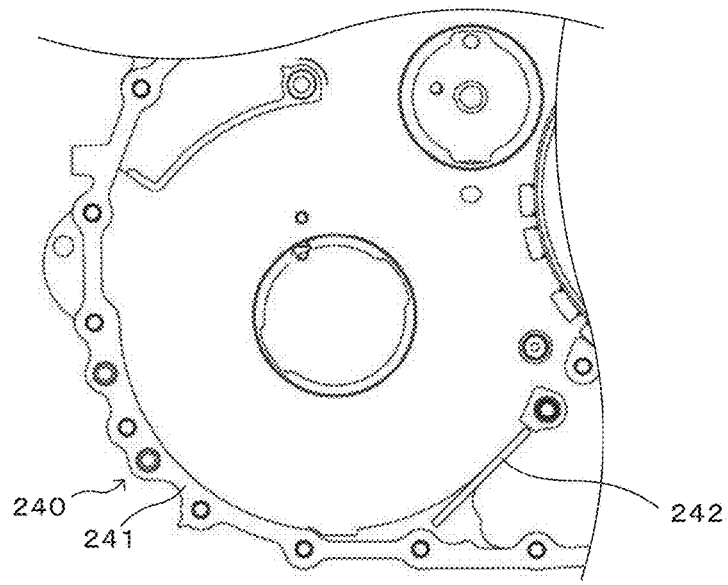
FIG. 5 is an explanatory diagram illustrating a transaxle case 240.
Figure 6:
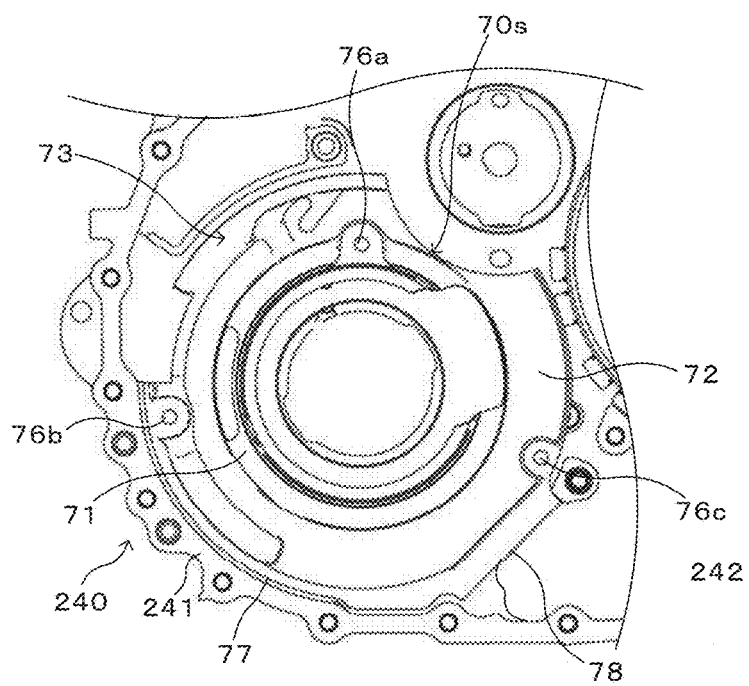
FIG. 6 is an explanatory diagram illustrating a state in which the reservoir plate 70 is disposed on a transaxle case 240.
Figure 7:
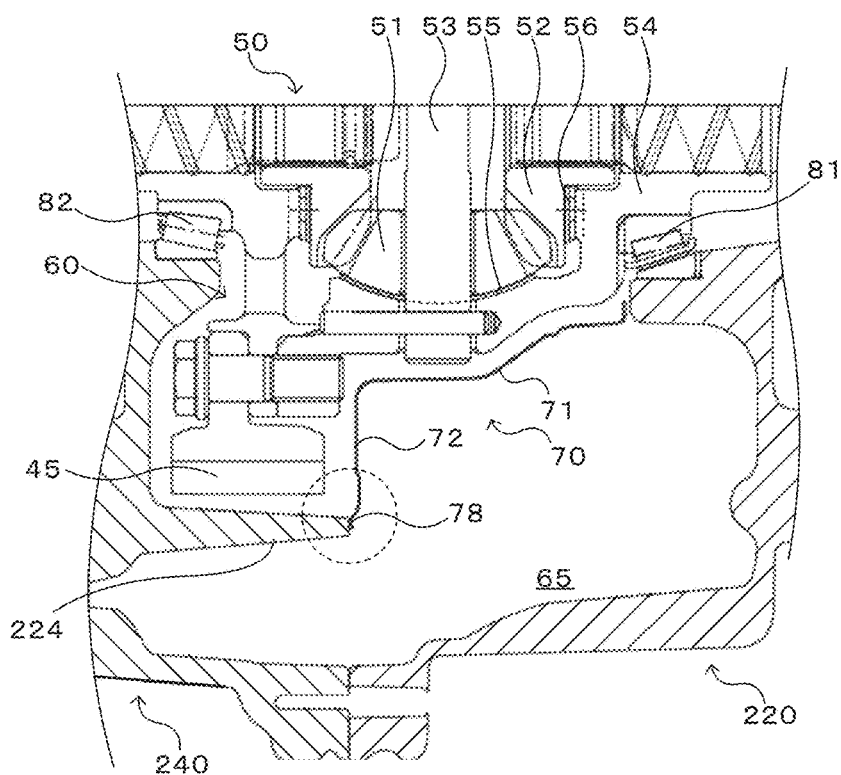
FIG. 7 is an explanatory diagram illustrating a sectional view taken along the line A-B in FIG. 3.
Figure 8:
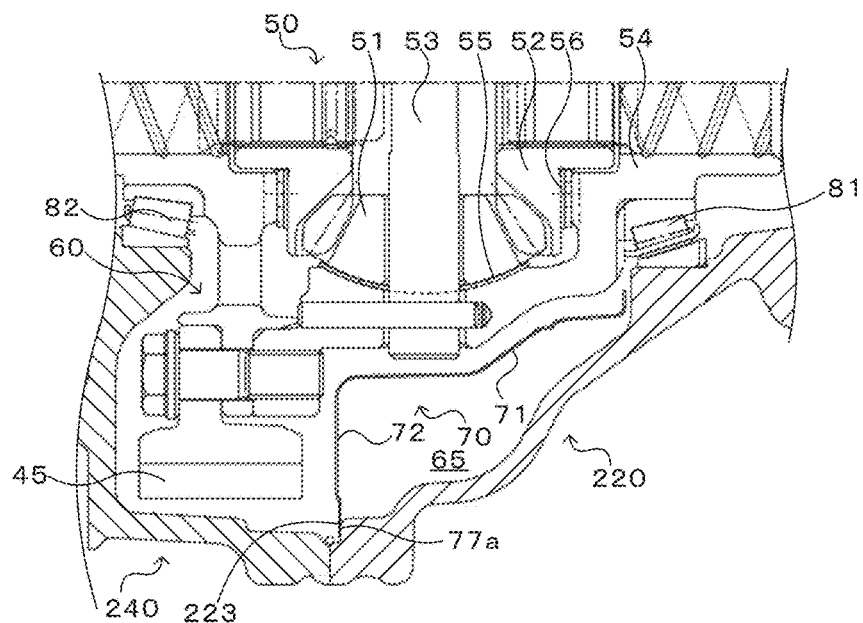
FIG. 8 is an explanatory diagram illustrating a sectional view taken along the line A-C in FIG. 3.
Figure 9:
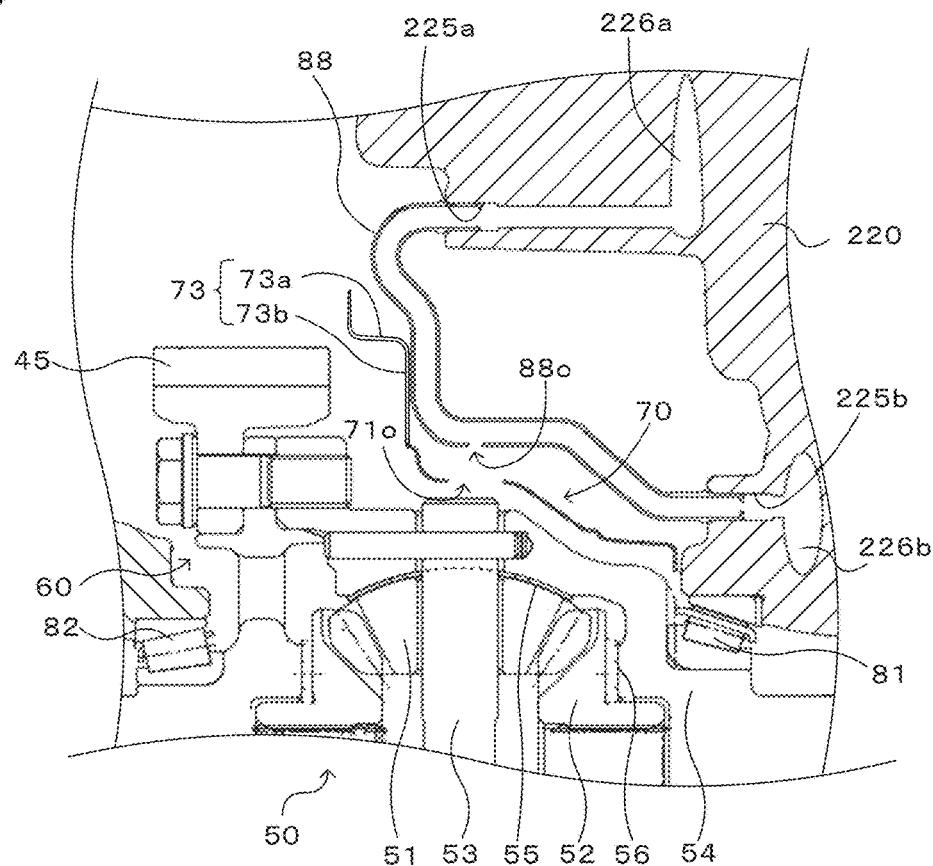
FIG. 9 is an explanatory diagram illustrating a sectional view taken along the line A-D in FIG. 3.

Subsequently, the structure around the differential ring gear 45 and the differential gear 50 in the power transfer device 20 will be described. FIG. 3 is an explanatory diagram illustrating a state in which a reservoir plate 70 is attached to the converter housing 220. FIG. 4 is an explanatory diagram illustrating the converter housing 220 to which the reservoir plate 70 is not attached. FIG. 5 is an explanatory diagram illustrating the transaxle case 240. FIG. 6 is an explanatory diagram illustrating a state in which the reservoir plate 70 is disposed on the transaxle case 240. FIG. 7 is an explanatory diagram illustrating a sectional view taken along the line A-B in FIG. 3. FIG. 8 is an explanatory diagram illustrating a sectional view taken along the line A-C in FIG. 3. FIG. 9 is an explanatory diagram illustrating a sectional view taken along the line A-D in FIG. 3. In FIG. 3, the upper left circle in the broken line indicates the drive pinion gear 44, and the center circle in the broken line indicates the differential ring gear 45. In FIG. 3, in addition, the dash-and-dot line indicates the liquid surface of working oil in a working oil storage chamber 65, and the arrow indicates the rotational direction of the differential ring gear 45.

Figure 10:
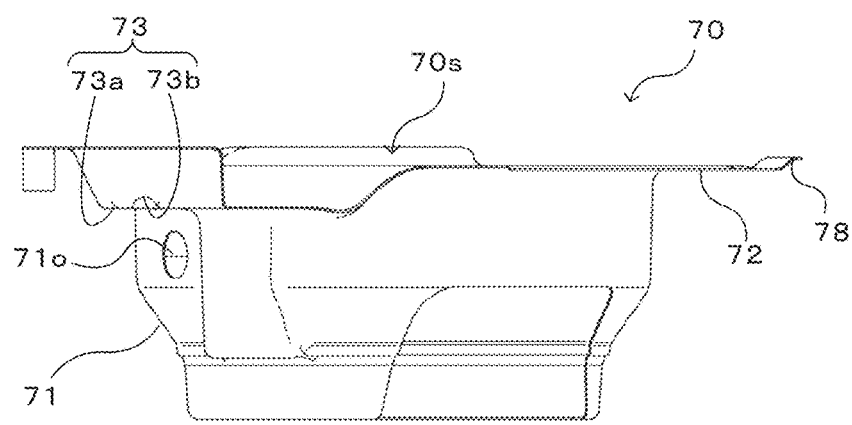
FIG. 10 is a view showing the outer appearance of the reservoir plate 70.
Figure 11:
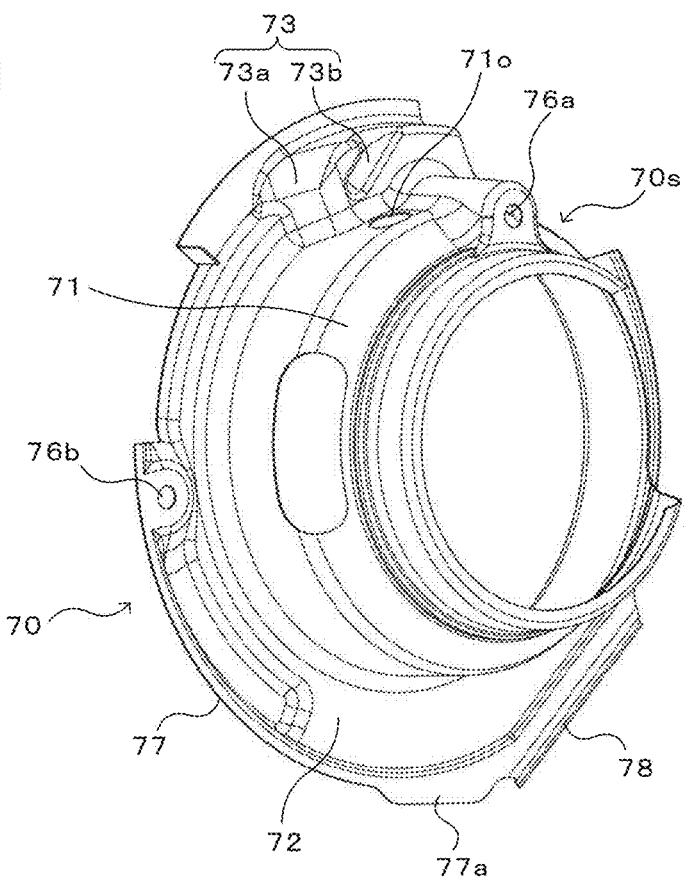
FIG. 11 is a view showing the outer appearance of the reservoir plate 70.
Figure 12:
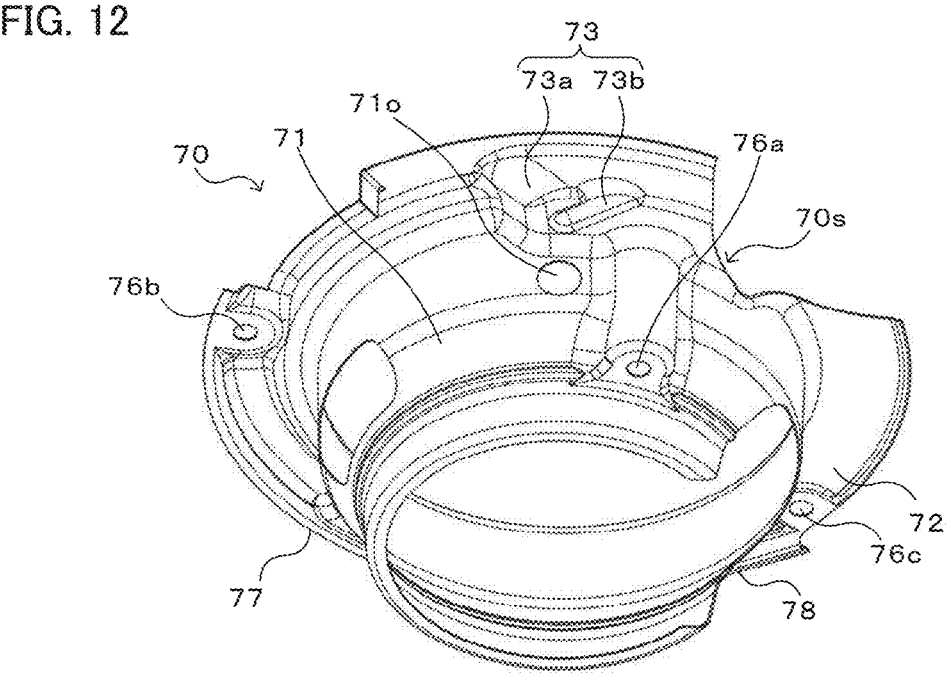
FIG. 12 is a view showing the outer appearance of the reservoir plate 70.

As illustrated in the drawings, a space inside the transmission case 22 which includes the converter housing 220 and the transaxle case 240 is partitioned by the reservoir plate 70 illustrated in FIGS. 10, 11, and 12 into a differential chamber 60, in which the differential ring gear 45 and the differential gear 50 are disposed, and the working oil storage chamber 65, in which working oil is stored. In the following description, the terms "upper" and "lower" indicate the "upper" and "lower" sides, respectively, in the vertical direction with the power transfer device 20 mounted on the vehicle.

As illustrated in FIGS. 3 and 4, the converter housing 220 has a housing-side mating surface (first case mating surface) 221 for assembly to the transaxle case 240. A housing-side stepped surface 223 that is stepped inward by about the thickness of the reservoir plate 70 is formed along the housing-side mating surface 221 in the range from the vicinity of the bottom portion of the housing-side mating surface 221 to a location above and to the right in the drawing by approximately 90 degrees along the outer edge of the reservoir plate 70. In addition, as illustrated in FIGS. 4 and 9, a working oil supply pipe 88 that connects between an oil passage 226a via an oil hole 225a and an oil passage 226b via an oil hole 225b formed in the converter housing 220 is disposed in the converter housing 220.

As illustrated in FIGS. 5 and 6, the transaxle case 240 has a case-side mating surface (second case mating surface) 241 for assembly to the converter housing 220. The transaxle case 240 is provided with a rib 242 that extends linearly and rightward in the drawing from the vicinity of the bottom portion toward the center at an angle of approximately 45 degrees.

As illustrated in FIGS. 10 to 12, the reservoir plate 70 includes a tubular portion 71 and a flange portion 72 that extends radially outward from the tubular portion 71. As illustrated in FIG. 3, the reservoir plate 70 is attached and fixed to the converter housing 220 by three bolts 86a to 86c using a bolt hole 76a formed in the tubular portion 71 and two bolt holes 76b and 76c formed in the flange portion 72. The reservoir plate 70 which is constituted from the tubular portion 71 and the flange portion 72 is formed by pressing a metal material such as iron. The reservoir plate 70 may be molded from a resin by injection molding.

As illustrated in FIGS. 7 to 9, the tubular portion 71 is formed to extend along a part of the outer peripheral surface of the differential case 54 of the differential gear 50, and mainly surrounds a portion of the differential case 54 excluding a side gear support portion (a portion supported by the converter housing 220 via the bearing 81) on one side of the differential case 54. A slight clearance is defined between an end portion of the tubular portion 71 on the converter housing 220 side and the converter housing 220 with the reservoir plate 70 fixed to the transmission case 22.

The flange portion 72 extends radially outward from an end portion of the tubular portion 71 on the transaxle case 240 side. In addition, a notched portion 70s is formed above the flange portion 72 and the tubular portion 71 so as not to interfere with a bearing (not illustrated) that rotatably supports the counter shaft 42. Consequently, the flange portion 72 extends in an arc shape (in a generally C-shape) around the tubular portion 71. As illustrated in FIG. 3, a first seal portion 77 is formed at the outer edge portion of the flange portion 72 from the bottom portion to a location above and to the right in the drawing by approximately 90 degrees, including the bottom portion. The first seal portion 77 abuts against the housing-side stepped surface 223 of the converter housing 220 to secure seal of the first seal portion 77. In addition, a second seal portion 78 is formed at the outer edge portion of the flange portion 72 from the first seal portion 77 to a location above and to the left in the drawing by approximately 60 degrees. The second seal portion 78 abuts against the rib 242 which is formed on the transaxle case 240, and is pressed by the rib 242 to secure seal of the second seal portion 78.

As illustrated in FIGS. 3 and 10 to 12, the outer edge of the second seal portion 78 is formed linearly, and the second seal portion 78 is formed so as to project toward the rib 242 of the transaxle case 240 such that the outer edge of the second seal portion 78 easily abuts against the rib 242. Therefore, the second seal portion 78 is pressed by the rib 242 to be elastically deformed, which secures seal of the second seal portion 78 better.

As illustrated in FIGS. 3 and 11, a positioning portion 77a in a projecting shape is formed at the bottom portion of the first seal portion 77, and extends radially so as to be aligned with a recessed portion at the bottom portion of the converter housing 220. Providing the positioning portion 77a facilitates positioning of the reservoir plate 70 during assembly to the converter housing 220. In particular, the positioning portion 77a is formed in the vicinity of the second seal portion 78, which makes it possible to suppress displacement between the second seal portion 78 and the rib 242.

A holding portion 73 that holds the working oil supply pipe 88 which is disposed in the converter housing 220 is formed in the vicinity of the bolt hole 76a of the flange portion 72 (on the right side of the bolt 86a in FIG. 3). As illustrated in FIGS. 9 to 12, the holding portion 73 has an overhanging portion 73a formed so as to overhang toward the converter housing 220, and a dented portion 73b formed in the overhanging portion 73a along the working oil supply pipe 88. Thus, with the holding portion 73, the dented portion 73b abuts against the working oil supply pipe 88 to push the working oil supply pipe 88 toward the converter housing 220 to hold the working oil supply pipe 88. Since the working oil supply pipe 88 is held by the holding portion 73 which is formed on the flange portion 72 of the reservoir plate 70 in this way, it is not necessary to use another member such as a clamp member in order to hold the working oil supply pipe 88. Since the dented portion 73b is formed along the working oil supply pipe 88, in addition, the working oil supply pipe 88 can be stably held by the dented portion 73b. Since the holding portion 73 is formed in a complex shape from the overhanging portion 73a and the dented portion 73b with recesses and projections, further, the strength of the holding portion 73 against bending etc. can be enhanced.

As illustrated in FIG. 9, the working oil supply pipe 88 is provided with at least one working oil supply hole 88o formed in the vicinity of a portion held by the holding portion 73. As illustrated in FIGS. 9 to 12, meanwhile, the tubular portion 71 of the reservoir plate 70 is provided with an opening portion 71o formed at a position under the working oil supply hole 88o. Consequently, working oil can be supplied from the working oil supply hole 88o of the working oil supply pipe 88 to the pinion shaft 53 of the differential gear 50 via the opening portion 71o of the tubular portion 71 to lubricate and cool the pinion shaft 53. As discussed above, the working oil supply pipe 88 is held by the holding portion 73, and the opening portion 71o is formed in the vicinity of the holding portion 73. Thus, the working oil supply hole 88o is precisely positioned directly above the opening portion 71o. Therefore, working oil from the working oil supply hole 88o is supplied to the pinion shaft 53 via the opening portion 71o even if the diameter of the opening portion 71o is not increased. Therefore, the opening portion 71o can be reduced in size to enhance the strength of the reservoir plate 70. The oil hole 225b, for which the working oil supply pipe 88 is disposed, communicates with an oil passage (not illustrated) formed in the converter housing 220 to open in the vicinity of the bearing 81. Working oil from the working oil supply pipe 88 can be supplied to the bearing 81 to lubricate and cool the bearing 81. At least a part of the working oil supplied to the bearing 81 is discharged from the differential chamber 60 to the working oil storage chamber 65 via a clearance defined between the tubular portion 71 of the reservoir plate 70 and the converter housing 220.

In the power transfer device 20 according to the embodiment described above, the flange portion 72 of the reservoir plate 70 is provided with the holding portion 73 which holds the working oil supply pipe 88 which is disposed in the converter housing 220. Thus, it is possible to reduce the number of components and achieve better assembly compared to a configuration in which another member such as a clamp member is used to hold the working oil supply pipe 88. Moreover, the holding portion 73 is provided with the overhanging portion 73a which is formed so as to overhang toward the converter housing 220, and the dented portion 73b which is formed in the overhanging portion 73a along the working oil supply pipe 88. Thus, the working oil supply pipe 88 can be stably held by the dented portion 73b. Since the holding portion 73 is formed in a complex shape from the overhanging portion 73a and the dented portion 73b with recesses and projections, in addition, the strength of the holding portion 73 against bending etc. can be enhanced.

In the power transfer device 20 according to the embodiment, in addition, the working oil supply hole 88o is formed in the vicinity of a portion of the working oil supply pipe 88 held by the holding portion 73, and the opening portion 71o is formed in the tubular portion 71 of the reservoir plate 70 at a position under the working oil supply hole 88o. Thus, working oil can be supplied from the working oil supply hole 88o of the working oil supply pipe 88 to the pinion shaft 53 of the differential gear 50 via the opening portion 71o of the tubular portion 71 to lubricate and cool the pinion shaft 53. The working oil supply pipe 88 is held by the holding portion 73, and the opening portion 71o is formed in the vicinity of the holding portion 73. Thus, the working oil supply hole 88o is precisely positioned directly above the opening portion 71o, which makes it possible to reduce the diameter of the opening portion 71o. As a result, the strength of the reservoir plate 70 can be enhanced.

In the power transfer device 20 according to the embodiment, originally, the first seal portion 77 is formed at the outer edge portion including the bottom portion of the flange portion 72 of the reservoir plate 70, and abuts against the housing-side stepped surface 223 of the converter housing 220 to secure seal of the first seal portion 77, and the second seal portion 78 is formed to extend from the bottom portion of the flange portion 72 toward the side opposite to the first seal portion 77, and abuts and is pressed against the rib 242 of the transaxle case 240 to secure seal of the second seal portion 78. The second seal portion 78 is formed linearly, and thus the state of contact with the rib 242 can be maintained, even if the second seal portion 78 is pressed and deformed by the rib 242, compared to a seal portion with an arc-shaped or curved outer edge, which makes it possible to secure seal better. As a result, it is possible to better suppress an inflow of working oil from the working oil storage chamber 65 into the differential chamber 60, and to further reduce the stirring resistance of working oil which acts on the differential ring gear 45.

In the power transfer device 20 according to the embodiment, the holding portion 73 is composed of the overhanging portion 73a which is formed so as to overhang toward the converter housing 220, and the dented portion 73b which is formed in the overhanging portion 73a along the working oil supply pipe 88. However, the holding portion 73 may be formed in a different shape as long as the holding portion 73 holds the working oil supply pipe 88.

In the power transfer device 20 according to the embodiment, the working oil supply hole 88o is formed in the vicinity of a portion of the working oil supply pipe 88 held by the holding portion 73, and the opening portion 71o is formed in the tubular portion 71 of the reservoir plate 70 at a position under the working oil supply hole 88o. However, the working oil supply hole 88o may be formed at a position away from a portion of the working oil supply pipe 88 held by the holding portion 73, and the opening portion 71o may be formed in the tubular portion 71 of the reservoir plate 70 at a position under the working oil supply hole 88o.

In the power transfer device 20 according to the embodiment, the positioning portion 77a is provided to the first seal portion 77. However, the positioning portion 77a may be provided to another member.

While a mode for carrying out the present disclosure has been described above by way of an embodiment, it is a matter of course that the present subject matter is not limited to the embodiment in any way, and that the present subject matter may be implemented in various forms without departing from the scope of the present disclosure.

In the power transfer device according to the present disclosure, the partitioning member may be fixed to the first case member; the working oil supply pipe may be composed of an axial pipe that extends in an axial direction of the differential gear from the first case member and a radial pipe that extends in a radial direction of the differential gear from an end portion of the axial pipe on a side opposite to the first case member; and the holding portion may abut against the radial pipe. This allows the radial pipe of the working oil supply pipe to be held between the first case member and the partitioning member, which makes it possible to hold the working oil supply pipe more reliably and to retain the working oil supply pipe more reliably.

In the power transfer device according to the present disclosure, the partitioning member may be fastened by a bolt in a state of abutting against the working oil supply pipe; and the bolt may be fastened in the same direction as a direction of insertion of the working oil supply pipe. This allows the working oil supply pipe to be fastened in the direction of insertion into the first case member.

In the power transfer device according to the present disclosure, the holding portion may have an overhanging portion that overhangs toward the first case member and a dented portion formed in the overhanging portion along the working oil supply pipe. This allows the working oil supply pipe to be stably held by the dented portion, and provides the holding portion with a complex shape to enhance the strength of the holding portion against bending etc.

In the hydraulic control device according to the present disclosure, in addition, the working oil supply pipe may have a working oil supply hole provided under and vertical relative to the vicinity of a portion held by the holding portion and configured to supply working oil; and the partitioning member may have an opening portion provided vertically under the working oil supply hole and configured to supply working oil from the working oil supply hole toward the differential chamber. Consequently, the working oil supply hole and the opening portion are formed in the vicinity of the holding portion. Thus, it is possible to reduce the diameter of the opening portion for supplying working oil toward the differential chamber, and to enhance the strength of the partitioning member.

In the power transfer device according to the present disclosure, the first case member may be provided with a first case mating surface formed at the outer edge, and a first stepped surface formed in the vicinity of the bottom portion of the first case mating surface and stepped inward from the first case mating surface; the second case member may be provided with a second case mating surface aligned with the first case mating surface, and a rib that extends from the vicinity of the bottom portion of the second case mating surface toward the center along the outer edge of the partitioning member; and the partitioning member may be provided with a first seal portion formed in a first range of the outer peripheral portion that extends in one direction from the bottom portion, including the bottom portion, to abut against and seal the first stepped surface, and a second seal portion formed in a second range of the outer peripheral portion that extends in the other direction from the vicinity of an end portion of the first range on the bottom portion side to extend in the radial direction and abut against the rib. This allows the first seal portion of the partitioning member to abut against the first stepped surface to secure seal of the first seal portion, and allows the second seal portion to abut against the rib of the second case member to secure seal of the second seal portion. Consequently, it is possible to better suppress an inflow of working oil into the differential chamber in which the differential ring gear and the differential gear are disposed, and to further reduce the stirring resistance of working oil which acts on the differential ring gear.

INDUSTRIAL APPLICABILITY

The present disclosure is applicable to, for example, the power transfer device manufacturing industry etc.

The invention claimed is:
1. A power transfer device comprising:
a differential ring gear disposed below a drive pinion gear on the input side and meshed with the drive pinion gear;
a differential gear coupled to the differential ring gear;
a case that houses the differential ring gear and the differential gear; and
a partitioning member that partitions a space in the case into a differential chamber, in which the differential ring gear and the differential gear are disposed, and a working oil storage chamber, in which working oil is stored, wherein:
the partitioning member forms the working oil storage chamber together with a first case member of the case, and forms the differential chamber together with a second case member of the case;
a working oil supply pipe through which working oil is supplied to the differential gear has a portion disposed within the first case member; and
the partitioning member has a holding portion provided on the first case member side to abut the working oil supply pipe in a direction of insertion.

2. The power transfer device according to claim 1, wherein:
the partitioning member is fixed to the first case member;
the working oil supply pipe is composed of an axial pipe that extends in an axial direction of the differential gear from the first case member and a radial pipe that extends in a radial direction of the differential gear from an end portion of the axial pipe on a side opposite to the first case member; and
the holding portion abuts against the radial pipe.

3. The power transfer device according to claim 2, wherein:
the partitioning member is fastened by a bolt in a state of abutting against the working oil supply pipe; and
the bolt is fastened in the same direction as a direction of insertion of the working oil supply pipe.

4. The power transfer device according to claim 3, wherein
the holding portion has an overhanging portion that overhangs toward the first case member and a dented portion formed in the overhanging portion along the working oil supply pipe.

5. The power transfer device according to claim 4, wherein:
the working oil supply pipe has a working oil supply hole provided under and vertical relative to a portion of the working oil supply pipe held by the holding portion and configured to supply working oil; and
the partitioning member has an opening portion provided vertically under the working oil supply hole and configured to supply working oil from the working oil supply hole toward the differential chamber.

6. The power transfer device according to claim 1, wherein:
the partitioning member is fastened by a bolt in a state of abutting against the working oil supply pipe; and
the bolt is fastened in the same direction as a direction of insertion of the working oil supply pipe.

7. The power transfer device according to claim 6, wherein
the holding portion has an overhanging portion that overhangs toward the first case member and a dented portion formed in the overhanging portion along the working oil supply pipe.

8. The power transfer device according to claim 7, wherein:
the working oil supply pipe has a working oil supply hole provided under and vertical relative to a portion of the working oil supply pipe held by the holding portion and configured to supply working oil; and
the partitioning member has an opening portion provided vertically under the working oil supply hole and configured to supply working oil from the working oil supply hole toward the differential chamber.

9. The power transfer device according to claim 6, wherein:
the working oil supply pipe has a working oil supply hole provided under and vertical relative to a portion of the working oil supply pipe held by the holding portion and configured to supply working oil; and
the partitioning member has an opening portion provided vertically under the working oil supply hole and configured to supply working oil from the working oil supply hole toward the differential chamber.

10. The power transfer device according to claim 1, wherein
the holding portion has an overhanging portion that overhangs toward the first case member and a dented portion formed in the overhanging portion along the working oil supply pipe.

11. The power transfer device according to claim 10, wherein:
the working oil supply pipe has a working oil supply hole provided under and vertical relative to a portion of the working oil supply pipe held by the holding portion and configured to supply working oil; and
the partitioning member has an opening portion provided vertically under the working oil supply hole and configured to supply working oil from the working oil supply hole toward the differential chamber.

12. The power transfer device according to claim 1, wherein:
the working oil supply pipe has a working oil supply hole provided under and vertical relative to a portion of the working oil supply pipe held by the holding portion and configured to supply working oil; and
the partitioning member has an opening portion provided vertically under the working oil supply hole and configured to supply working oil from the working oil supply hole toward the differential chamber.

13. The power transfer device according to claim 2, wherein
the holding portion has an overhanging portion that overhangs toward the first case member and a dented portion formed in the overhanging portion along the working oil supply pipe.

14. The power transfer device according to claim 13, wherein:
the working oil supply pipe has a working oil supply hole provided under and vertical relative a portion of the working oil supply pipe held by the holding portion and configured to supply working oil; and
the partitioning member has an opening portion provided vertically under the working oil supply hole and configured to supply working oil from the working oil supply hole toward the differential chamber.

15. The power transfer device according to claim 2, wherein:
the working oil supply pipe has a working oil supply hole provided under and vertical relative to a portion of the working oil supply pipe held by the holding portion and configured to supply working oil; and
the partitioning member has an opening portion provided vertically under the working oil supply hole and configured to supply working oil from the working oil supply hole toward the differential chamber.

16. The power transfer device according to claim 3, wherein:
the working oil supply pipe has a working oil supply hole provided under and vertical relative to a portion of the working oil supply pipe held by the holding portion and configured to supply working oil; and
the partitioning member has an opening portion provided vertically under the working oil supply hole and configured to supply working oil from the working oil supply hole toward the differential chamber.

* * * * *